Jan. 7, 1936.  C. P. WELDON  2,027,135
BRAKE
Filed March 3, 1932   2 Sheets-Sheet 1

INVENTOR:
CHICHESTER P. WELDON,
BY Gales P. Moore
HIS ATTORNEY.

Jan. 7, 1936.   C. P. WELDON   2,027,135
BRAKE
Filed March 3, 1932   2 Sheets-Sheet 2

INVENTOR:
CHICHESTER P. WELDON,
By Gales P. Moore
HIS ATTORNEY.

Patented Jan. 7, 1936

2,027,135

UNITED STATES PATENT OFFICE 2,027,135

BRAKE

Chichester P. Weldon, Bristol, Conn., assignor, by mesne assignments, to General Motors Corporation, Detroit, Mich., a corporation of Delaware Application March 3, 1932, Serial No. 596,441

16 Claims. (Cl. 188—18)

This invention relates to brakes and comprises all of the features of novelty herein disclosed, by way of example, in connection with a brake for aeroplane wheels. Aeroplane wheels are often provided with "doughnut" or low pressure tires of small diameter but of large width and cross section to provide ample cushioning and traction effect against the ground. The large cross section necessitates a small-bored hub and the amount of space available between the hub and the supporting shaft is very much restricted. The supporting shaft is usually a stub axle of standard diameter projecting from the usual torque tube or torque plate carried by the fuselage and hence the shaft is supported or anchored at one end only. To reduce torsion or twisting effects, the shaft should be short, with the hub and brake close to the anchored end. To locate a brake of sufficient capacity between the hub and the torque plate would necessitate lengthening the shaft and displacing the hub outwardly to make room for a brake drum or the like. Suitable antifriction bearings are desirable for easy running of the wheels in taking off and these bearings apparently prevent the use of even that small unoccupied space within the hub, especially if the standard stub axle is used unchanged.

An object of the invention accordingly is to provide an improved brake which will overcome some or all of the above mentioned defects in prior constructions. Another object is to provide a brake of ample capacity that will utilize the space available in the most effective manner. Another object is to provide a brake, especially for stub-axle-mounted wheels, that can be housed inside of a hub at one side of a bearing and operated from the other side of the bearing near the anchored end of the stub axle. Still another object is to provide an improved, efficient and thoroughly practical brake for aeroplane wheels mounted on stub axles.

To these ends and to improve generally upon devices of this character, the invention consists in the various matters hereinafter described and claimed. In its broader aspects, the invention is not necessarily limited to the specific construction selected for illustrative purposes in the accompanying drawings in which Fig. 1 is a view principally in longitudinal cross section, the lower portion of the figure showing some parts in elevation with other parts removed or in section.

Figure 1:
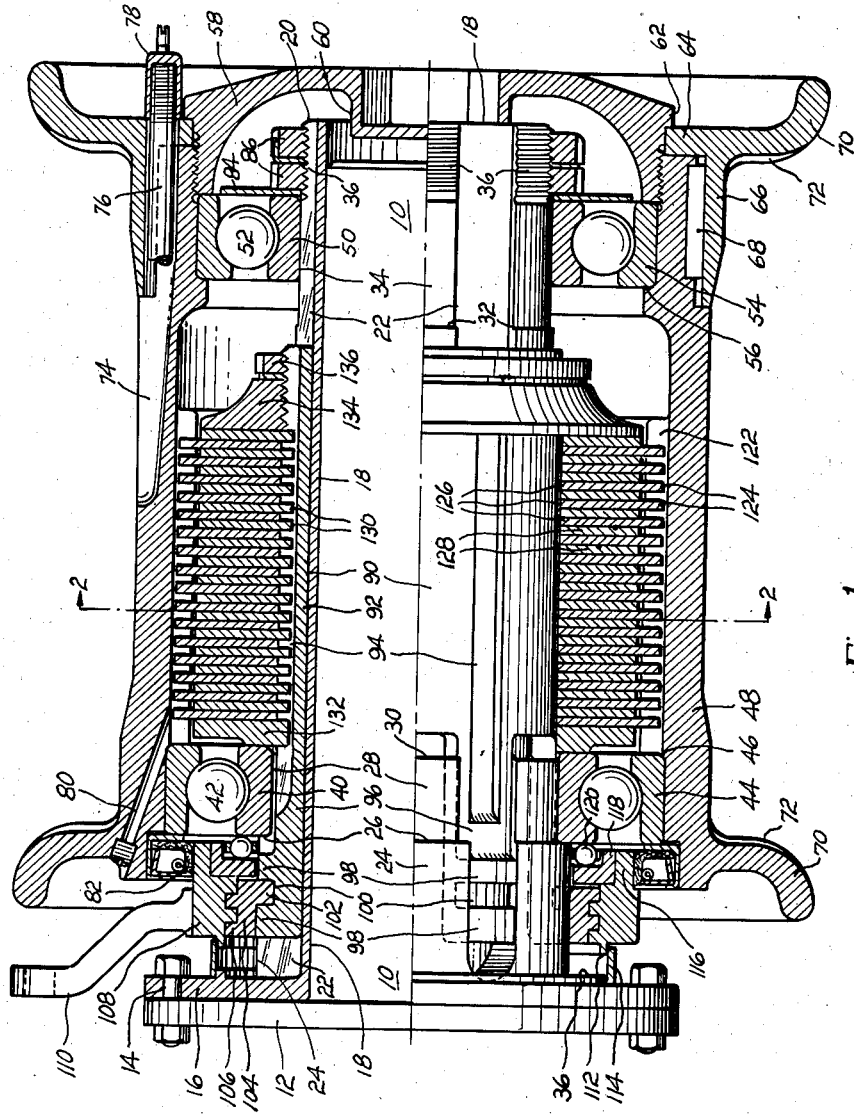
Figure 2:
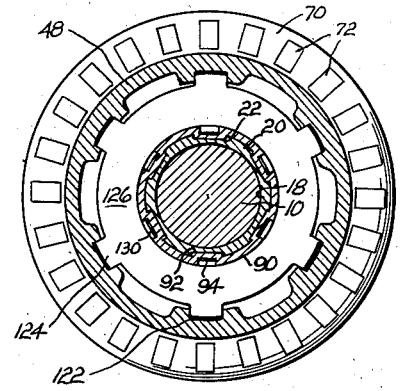
Fig. 2 is a cross sectional view to smaller scale than Fig. 1, the section being taken on line 2—2 of Fig. 1.
Figure 3:
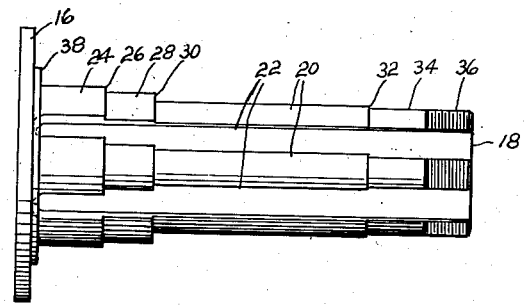
Fig. 3 is an elevation of the inner sleeve.
Figure 4:
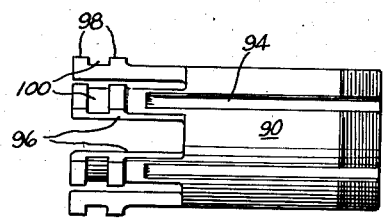
Fig. 4 is an elevation of the outer sleeve.
Figure 5:
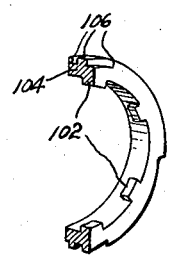
Fig. 5 is a perspective view, partly in section, of a nut.
Figure 6:
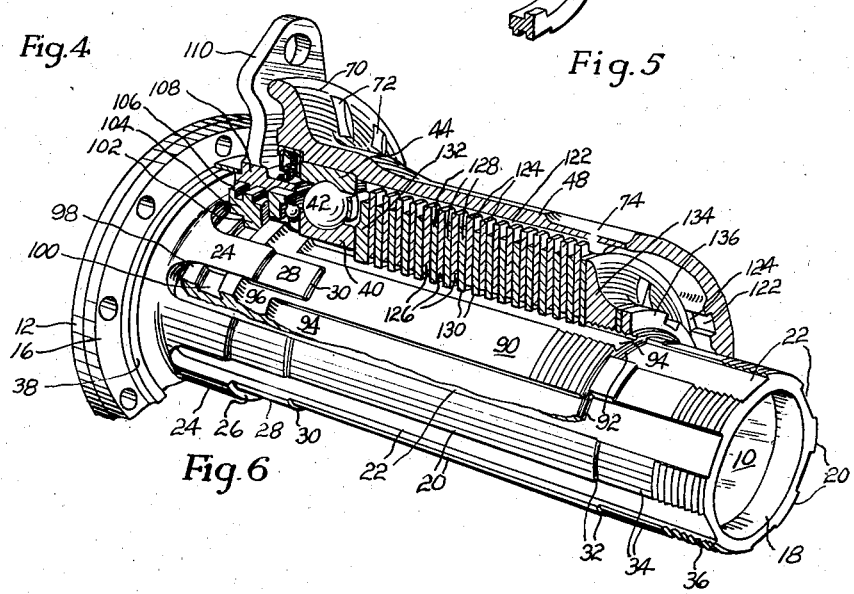
Fig. 6 is a perspective view with some parts removed or broken away and some in section.

The numeral 10 indicates an overhanging shaft or stub axle which may be integral with a flange or torque plate 12 adapted for attachment in any suitable way to the torque tube of an aeroplane (not shown). The torque plate has openings for bolts 14 which secure it to a flange 16 on a hollow shaft or sleeve 18. The sleeve 18 is internally cylindrical to fit the stub axle 10 and constitutes a detachable carrier or support for an aeroplane wheel and brake. Externally, the sleeve is provided with longitudinally extending ribs 20 forming a series of longitudinal grooves 22 running from the flange 16 to the end of the sleeve. The grooves are deepest adjacent to the flange 16 but the ribs are stepped down at intervals thus decreasing the depth of the grooves as the end of the sleeve is approached. The ribs thus present an interrupted cylindrical surface 24 terminating at a shoulder 26, another interrupted cylindrical surface 28 terminating at a shoulder 30, another such surface terminating at a shoulder 32, and still another such surface 34 whose outer end is threaded at 36. The flange 16 also has an annular rib 38 on one side for a purpose that will appear later.

Seated on the surface 28 and against the shoulder 26 is the inner race ring 40 of a ball bearing 42, the outer race ring 44 of the bearing abutting against a shoulder 46 in a hub 48. Seated on the surface 34 is the inner race ring 50 of a ball bearing 52, the outer race ring 54 of the bearing abutting against a shoulder 56 in the hub. The outer race ring 54 is clamped against its shoulder by a threaded cap 58 screwing into the outer end of the hub. The cap has a central projection 60 which is internally hexagonal to receive a wrench. A flange 62 on the cap engages a flange 64 on a demountable rim member 66 to lock the latter to the hub, the hub and rim member being held from relative rotation by a key 68. The hub and the rim member have flanges 70 whose inner curved walls are provided with grooves 72 to grip a wide pneumatic tire (not shown). The hub is grooved out at 74 for a bent valve, a part of the valve being indicated at 76 with a cap 78 at the exposed end. An oil duct 80, which may be closed by a removable plug, extends at an inclination through the hub, and a suitable oil seal is provided at 82. The inner race ring 50 is clamped on the threaded end 36 of the sleeve 18 by a washer 84 and nuts 86, the tension thus exerted on the sleeve tending also to draw the shoulder 26 against the other inner race ring 40 and so holding the outer race rings against their abutment shoulders and holding the bearing elements under an initial load.

The sleeve 18 slidably supports an outer sleeve 90 which actuates a brake. The sleeve 90 is provided with internally projecting longitudinal ribs 92 fitting slidably in the grooves 22 of the sleeve 18. The exterior cylindrical surface of the sleeve 90 is interrupted by a series of longitudinal grooves 94 which are opposite to and narrower than the ribs 92. The grooves 94 extend from one end of the sleeve and part way along the length of a series of fingers 96 which form axial extensions of the sleeve. The fingers lie in the deeper portions of the grooves 22 of the inner sleeve 18 and interdigitate with the raised surfaces 24 and 28 of the ribs on the inner sleeve. Spaced lugs 98 on the fingers are flush with the surface 24 and form a series of arcuate grooves 100 receiving lugs 102 projecting inwardly from a threaded member 104 which surrounds the endmost set of lugs 98. The lugs 102 fit in the longitudinal grooves 22 of the inner sleeve as well as in the circumferential grooves 100 of the outer sleeve and thus the threaded member 104 cannot move circumferentially or axially with respect to the slidable outer sleeve 90 but both can move together axially. The member 104 has a triple thread 106 externally, the threads fitting similar threads on the interior of a rockable brake actuator 108 having a bent brake arm 110 which is suitably connected by a link (not shown) to the fuselage. The actuator 108 has an annular side flange 112 loosely surrounded by a dust band 114 which is welded or otherwise attached to the side flange 38. The dust band also acts as a stop to prevent axial shifting of the actuator away from the hub 48. An extension 116 of the actuator is externally finished to make a smooth seat for the oil seal 82 and encloses an internal recess which receives an angled thrust plate 118 for an antifriction thrust bearing 120. The bearing is shown as a ball bearing having a separator for the balls which bear against the adjacent end face of the inner race ring 40. The bearing thus prevents axial shifting movement of the actuator 108 towards the hub but facilitates rocking of the actuator.

The interior of the hub is provided with pairs of longitudinally extending ribs forming grooves 122 receiving outwardly projecting lugs 124 on brake elements in the form of discs 126 which loosely surround the slidable sleeve 90. The discs 126 are preferably of aluminum or phosphor bronze and alternate with discs 128 which are preferably of steel and have inwardly projecting lugs 130 fitting in the grooves 94 of the slidable sleeve. The two series of discs are confined between thick abutment collars 132 and 134. The collar 132 is keyed to the sleeve and abuts against the race ring 40 but clears the outer ring 44. The collar 134 is threaded on the slidable sleeve 90 and is clamped in adjusted position by a nut 136. In the initial or normal position of the actuator 108, the outer set of brake discs 126 are free to rotate with the hub 48 and can slide a little with respect to the hub. When the actuator 108 is rocked angularly about the axis of the hub, the threads at 106 cause the slidable sleeve 90 to shift axially on the inner sleeve 18 thus forcing the collar 134 towards the collar 132 and placing the two sets of brake discs in frictional rubbing contact to slow down the vehicle. When the actuator 108 is turned back to its initial position, the slidable sleeve 90 shifts back again to release the side pressure on the brake discs. The discs 128 are desirably heat treated spring steel and any slight warping is advantageous in that the return of the discs to their initial warped condition after compression aids in separating the discs and reduces the drag effect of large flat surface areas. The adjusted position of the collar 134 determines the initial clearances between the discs and consequently determines the amount of angular movement of the brake arm 110 that is needed to apply maximum braking pressure. Such angular movement is desirably small and once adjusted seldom needs changing. Braking reactions do not put a thrust load on the bearings but are balanced at opposite sides of the inner race ring 40. Oil introduced at the duct 80 lubricates the bearings, the discs, and the sliding sleeve, and is agitated by operation of the brake. To detach the hub, leaving the brake mechanism intact, the cap 58, nuts 86 and washer 84 are removed to permit sliding of the bearing 52 from the sleeve 18 and to permit the axial withdrawal of the hub from the other bearing 42, the hub having sliding movement along the lugs 124 at the grooves 122. The entire wheel and brake mechanism is free to slip from the stub axle 10 upon mere removal of the bolts 14.

In operation, to apply the brake, a slight rocking of the arm 110 will cause the threads 106 to produce an axial shifting of the fingers 96 and the sleeve 90 to the left in Fig. 1. The abutment collar 134 thereby forces the friction discs 126 and 128 together and turning of the hub is resisted. The brake is released by turning the arm 110 back to the original position.

I claim:

1. In a brake, a non-rotary overhanging support, a rotatable hub, a bearing between the hub and the support, a sleeve slidably mounted on the support and keyed against rotation with respect thereto, braking means housed within the hub at one side of the bearing for frictionally connecting the hub to the sleeve, and means adjacent to the anchored end of the support at the other side of the bearing for sliding the sleeve to operate the braking means, said sleeve-sliding means and said braking means reacting against opposite sides of the bearing; substantially as described.

2. In a device of the character described, a non-rotary support, a rotatable hub, a bearing between the hub and the support and engaging the support, a sleeve slidably mounted for axial movement on one of the last named parts and having an extension passing between the one member and the bearing, a brake actuator at one side of the bearing for sliding the sleeve, and means at the other side of the bearing and housed within the hub for frictionally resisting the turning of the hub with respect to the support; substantially as described.

3. In a device of the character described, a non-rotary support, a rotatable hub, a bearing between the hub and the support and engaging the support, a sleeve slidably mounted on the support and having an extension passing between the support and the bearing, a brake actuator at one side of the bearing for sliding the sleeve axially, and braking means at the other side of the bearing for frictionally connecting the hub to the sleeve; substantially as described.

4. In a device of the character described, a non-rotary support, a rotatable hub, a bearing between the hub and the support, the support having longitudinal ribs and intervening grooves, a sliding sleeve having ribs entering the grooves and fingers extending past the bearing, braking means associated with the sleeve, and a brake actuator having operating connection with the fingers; substantially as described.

5. In a device of the character described, a non-rotary support, a rotatable hub, a bearing between the hub and the support, brake discs housed within the hub and movable towards the inner side of the bearing for frictionally resisting the turning of the hub with respect to the support, a rockable actuator bearing against the outer side of the bearing, and means for causing braking pressure to be transmitted from the rockable actuator to the brake discs; substantially as described.

6. In a device of the character described, a non-rotary support, a rotatable hub, a bearing between the hub and the support, a movable member extending between the bearing and one of said last named parts and having an abutment, brake discs housed within the hub between the abutment and the inner side of the bearing, a rockable actuator bearing against the outer side of the bearing, and means for causing the rocking of the actuator to move said member; substantially as described.

7. In a device of the character described, a non-rotary support, a rotatable hub, a bearing between the hub and the support, a movable member extending between the bearing and one of said last named parts and having an abutment, brake discs between the abutment and the inner side of the bearing, a rockable actuator bearing against the outer side of the bearing, and the rockable actuator and said member having a screw threaded connection; substantially as described.

8. In a device of the character described, a non-rotary support, a rotatable hub, a bearing between the hub and the support, a sleeve slidably mounted on one of the last named parts and keyed against rotation with respect thereto, brake elements housed within the hub for actuation by the sleeve, the sleeve having an extension extending past the bearing to the outside of the hub, a rockable actuator held against axial movement with respect to the hub, and a screw threaded connection between the actuator and the sleeve extension; substantially as described.

9. In a device of the character described, a non-rotary support, a rotatable hub, a bearing between the hub and the support, a sleeve slidably mounted on one of the last named parts and keyed against rotation with respect thereto, the sleeve having an abutment, brake discs between the abutment and the inner side of the bearing, a rockable actuator at the outer side of the bearing, means for causing the rocking of the actuator to slide the sleeve, and means for adjusting the abutment on the sleeve; substantially as described.

10. In a device of the character described, a non-rotary support, a rotatable hub, a bearing between the hub and the support, the support having longitudinal ribs and intervening grooves, a sleeve having internal ribs entering the grooves and an abutment, the sleeve having external grooves opposite to the internal ribs, brake discs keyed to the grooves in the sleeve, brake discs keyed to the hub, and means for sliding the sleeve to compress the discs between the abutment and the bearing; substantially as described.

11. In a device of the character described, a non-rotary support, a rotatable hub, a bearing between the hub and the support, the support having longitudinal ribs and intervening grooves, a sleeve having internal ribs entering the grooves, the sleeve having fingers extended past the bearing and occupying the grooves, brake elements for frictionally connecting the hub to the sleeve, and an actuator having operating connection with the fingers; substantially as described.

12. In a device of the character described, a non-rotary support, a rotatable hub, the support having longitudinal ribs and intervening grooves, a bearing mounted on the ribs and rotatably supporting the hub, a sleeve slidable on the support and having fingers extending past the bearing through the grooves, brake elements frictionally connecting the hub to the sleeve, and an actuator having operating connections with the fingers; substantially as described.

13. In a device of the character described, an inner sleeve having longitudinal ribs and intervening grooves, an outer sleeve having internal ribs entering the grooves, the outer sleeve having external grooves opposite to its ribs, a hub rotatably mounted on the inner sleeve and having grooves, brake elements having lugs entering the grooves of the hub, brake elements having lugs entering the grooves of the outer sleeve, and means for sliding the outer sleeve on the inner sleeve to press the brake elements into frictional contact; substantially as described.

14. In a device of the character described, a stub shaft, an inner sleeve detachably mounted on the shaft and having longitudinal ribs and intervening grooves, an outer sleeve having internal ribs entering the grooves, a hub rotatably mounted on the inner sleeve, brake elements keyed to the hub, brake elements keyed to one of the sleeves, and means for sliding said last named sleeve to press the brake elements into frictional contact; substantially as described.

15. In a device of the character described, an inner sleeve, an outer sleeve surrounding and sliding on the inner sleeve, a hub, braking elements housed within the hub for frictionally connecting the hub to the outer sleeve, antifriction bearings housed within the hub and rotatably supporting the hub upon the inner sleeve, the braking elements being between the bearings, means for closing the ends of the hub, and means for introducing lubricant to the bearings, brake elements and sliding sleeve; substantially as described.

16. In a brake, an overhanging support, a rotatable hub, a bearing between the hub and the support, brake discs housed inside of the hub for frictionally resisting the turning of the hub with respect to the support, means extending between the bearing and the overhanging support for operating the brake discs from the anchored end of the support, and said means urging the brake discs towards the anchored end of the support to avoid a tendency to push the hub from the support; substantially as described.

CHICHESTER P. WELDON.